(12) United States Patent
Choi et al.

(10) Patent No.: US 7,280,669 B2
(45) Date of Patent: Oct. 9, 2007

(54) DIGITAL IMAGE WATERMARKING APPARATUS AND METHOD

(75) Inventors: Jong-Uk Choi, Seoul (KR); Jung-Su Lee, Seoul (KR)

(73) Assignee: Markany, Inc., Seoul (KR)

( * ) Notice: Subject to any disclaimer, the term of this patent is extended or adjusted under 35 U.S.C. 154(b) by 785 days.

(21) Appl. No.: 10/380,389

(22) PCT Filed: Sep. 10, 2001

(86) PCT No.: PCT/KR01/01524

§ 371 (c)(1),
(2), (4) Date: Jul. 21, 2003

(87) PCT Pub. No.: WO02/21846

PCT Pub. Date: Mar. 14, 2002

(65) Prior Publication Data

US 2004/0091050 A1 May 13, 2004

(51) Int. Cl.
*G06K 9/00* (2006.01)
*G06K 9/36* (2006.01)
*H04L 9/00* (2006.01)

(52) U.S. Cl. .............. 382/100; 382/240; 382/250; 713/176; 380/46

(58) Field of Classification Search .............. 382/100, 382/166, 240, 250; 713/176; 380/44, 46
See application file for complete search history.

(56) References Cited

U.S. PATENT DOCUMENTS 5,809,139 A 9/1998 Girod et al.
6,222,932 B1 * 4/2001 Rao et al. .................... 382/100
6,240,121 B1 5/2001 Senoh
6,332,030 B1 * 12/2001 Manjunath et al. .......... 382/100
6,535,616 B1 * 3/2003 Hayashi et al. ............. 382/100
6,556,689 B1 * 4/2003 Xia et al. .................... 382/100
6,640,005 B1 * 10/2003 Westerman et al. ......... 382/166
6,674,873 B1 * 1/2004 Donescu et al. ............ 382/100

(Continued)

FOREIGN PATENT DOCUMENTS

EP 0891071 A2 1/1999

(Continued)

OTHER PUBLICATIONS

Kundur, D.; Hatzinakos, D., "Digital Watermarking Using Multiresolution Wavelet Decomposition," May 1998, Proc. IEEE Int. Conf. on Acoustics, Speech and Signal Processing, vol. 5, pp. 2969-2972.*

*Primary Examiner*—Andrew W. Johns
*Assistant Examiner*—Anthony Mackowey
(74) *Attorney, Agent, or Firm*—Blakely, Sokoloff, Taylor & Zafman; Stephen M. De Klerk (57) ABSTRACT

The present invention relates to a digital image watermarking apparatus and method. Luminance component of a digital image are transformed into coefficients of a frequency domain, and watermark is generated by encrypting a user key and generating pseudo random number from encrypted user key. Then, a replacement coefficient generated from a coefficient of a first frequency area and the watermark is replaced with a coefficient of a second frequency area so that the watermark is embedded into the digital image. The embedded watermark is extracted at an authenticating apparatus and the digital image is authenticated by finding the correlation between the extracted watermark and watermark for authentication.

14 Claims, 5 Drawing Sheets

U.S. PATENT DOCUMENTS

| | | |
|---|---|---|
| 6,788,800 B1 * | 9/2004 | Carr et al. .................. 382/100 |
| 6,807,285 B1 * | 10/2004 | Iwamura .................... 382/100 |
| 6,870,547 B1 * | 3/2005 | Crosby et al. .............. 345/619 |
| 6,973,195 B1 * | 12/2005 | Matsui ....................... 382/100 |
| 6,975,733 B1 * | 12/2005 | Choi et al. .................. 381/100 |
| 6,983,058 B1 * | 1/2006 | Fukuoka et al. ............ 382/100 |
| 2002/0009209 A1 * | 1/2002 | Inoue et al. ................ 382/100 |

FOREIGN PATENT DOCUMENTS

| | | |
|---|---|---|
| EP | 1006710 A2 | 6/2000 |
| EP | 1148708 A1 | 10/2001 |
| JP | 11032200 | 2/1999 |

\* cited by examiner

DISCRETE WAVELET TRANSFORM BY A FILTER BANK

FIG. 3

INVERSE DISCRETE WAVELET TRANSFORM BY A FILTER BANK

DIGITAL IMAGE WATERMARKING APPARATUS AND METHOD

CROSS-REFERENCE TO OTHER APPLICATIONS

This Application is a National Phase of International Application No. PCT/KR01/01524, filed on Sep. 10, 2001, which claims priority from Korean Patent Application No. 2000/53755, filed on Sep. 9, 2000.

BACKGROUND OF THE INVENTION

1. Field of the Invention

The present invention relates to a digital image watermarking apparatus and method, and more specifically, to a digital image watermarking apparatus and method which are able to extract the embedded watermark, and simultaneously not deteriorate the quality of a digital image, and which are able to extract the watermark without an original image by leaving a watermark in spite of print or various image alterations.

2. Description of the Related Art

As creation and distribution of-digital media, such a still image as a picture image or such a moving picture as an animation increase, the digital media is circulated through various storage media or network, and thus illegal copy or illegal alteration is largely increased. Various devices have been developed to prevent the digital media from illegally being altered or copied or circulated. As a device for implementing such object, the inventor of the present invention paid attention to a digital watermarking technology.

The digital watermarking technology is to prevent copy, distribution, alteration, sale, etc. without permission of the ownership holder of the digital data works by additionally embedding information undistinguishable with the naked eye in the digital data works.

There are a spatial domain method, a frequency domain method, a spread spectrum communication method, etc. in the digital watermarking technology widely known up to now. These digital watermarking technologies have some advantages in that it is easy to embed a watermark (spatial domain method) and it is difficult to remove a watermark (frequency domain method), etc., whereas, they have various disadvantages in that it is weak in an operation like filtering (spatial domain method), an image is damaged according to the value of coefficient (frequency domain method), or an original image is necessary for extracting a watermark and an original image is largely altered by an embedding watermark (spread spectrum communication method).

That is, the conventional digital watermarking technologies as described above failed to meet all the requirements, in particular, i) it must be difficult or impossible to remove the watermark embedded in a digital image (difficulty of access); ii) even if the digital image is printed or an image alteration for printing, for example, dithering or halftone, is made, the watermark embedded in the digital image must be robust enough to be extracted after such print or image alteration (robustness against alteration): iii) when a watermark is embedded in the digital image, the deterioration of quality of the digital image by watermark must be minimized (conservation of quality of the digital image); and iv) the embedded watermark can not be known except by a copyright holder or a person whose use is allowed (hiding of the embedded information) to prevent the illegal alteration, copy and distribution of the digital media thereby its range of application is very restrictive and it is difficult to fully obtain the object described above.

SUMMARY OF THE INVENTION

Accordingly, it is an object of the present invention to provide a digital image watermarking technology that meets all the requirements as described above. More specifically, it is an object of the present invention to provide a digital image watermarking apparatus and method in that the extraction of the embedded watermark is possible despite printing or various image alterations, access to the watermark becomes difficult by embedding invisible watermark, and an original image is not necessary in extracting watermark.

It is another object of the present invention to provide a digital image watermarking apparatus and method wherein the quality of the digital image is not largely deteriorated and it is very strong in conserving the watermark when the digital image with watermark embedded is printed having high resolution or the image is altered due to dithering or halftone, etc. since a watermark is embedded using a frequency domain characteristic.

It is still another object of the present invention to provide a digital image watermarking apparatus and method in that user key value inputted by a user is encrypted and generated as watermark and then embedded, after extracting watermark from a digital image, by determining whether the watermark generated from a user key input from a user is the same as the watermark extracted, it must grant authentication only if two watermarks are the same as each other and thus the security of watermark is much intensified.

It is still another object of the present invention to provide a digital image watermarking apparatus and method that maximizes accuracy of a watermark extraction and authentication by using the sharpening filter, the fourth moment (Kurtosis), peak value and its location thereof in the correlation between a user key value and watermark.

In order to achieve the object as described above, the present invention provides a method for embedding watermark into a digital image having a luminance component, comprising the steps of: (a) transforming said luminance component into coefficients of a frequency domain having a first frequency area and a second frequency area; (b) generating a replacement coefficient from a coefficient of said first frequency area and said watermark; (c) replacing a coefficient of said second frequency area with said replacement coefficient, whereby said watermark is embedded into said digital image; and (d) transforming said digital image embedded with said watermark into an inverse frequency domain.

In order to achieve another object of the present invention, the present invention provides a method for authenticating the digital image, comprising the steps of: (e) transforming the luminance component of the digital image embedded with said watermark into the coefficients of the frequency domain; (f) generating a watermark for authentication; (g) extracting said watermark embedded in said digital image by using the coefficients of said first and second frequency domains; and (h) authenticating said digital image by finding a correlation of said extracted watermark and said watermark for authentication.

DETAILED DESCRIPTION OF THE PREFERRED EMBODIMENTS

Hereinbelow, a digital image watermarking apparatus and method according to the preferred embodiment of the present invention referring to the figures attached are explained in detail.

In general, a digital image watermarking device is comprised of a digital image watermark embedding device for embedding watermark in a digital image and a digital image watermark authenticating device for authenticating image with watermark embedded. Such devices can be used in an independent or combination manner according to various embodiments.

Figure 1:
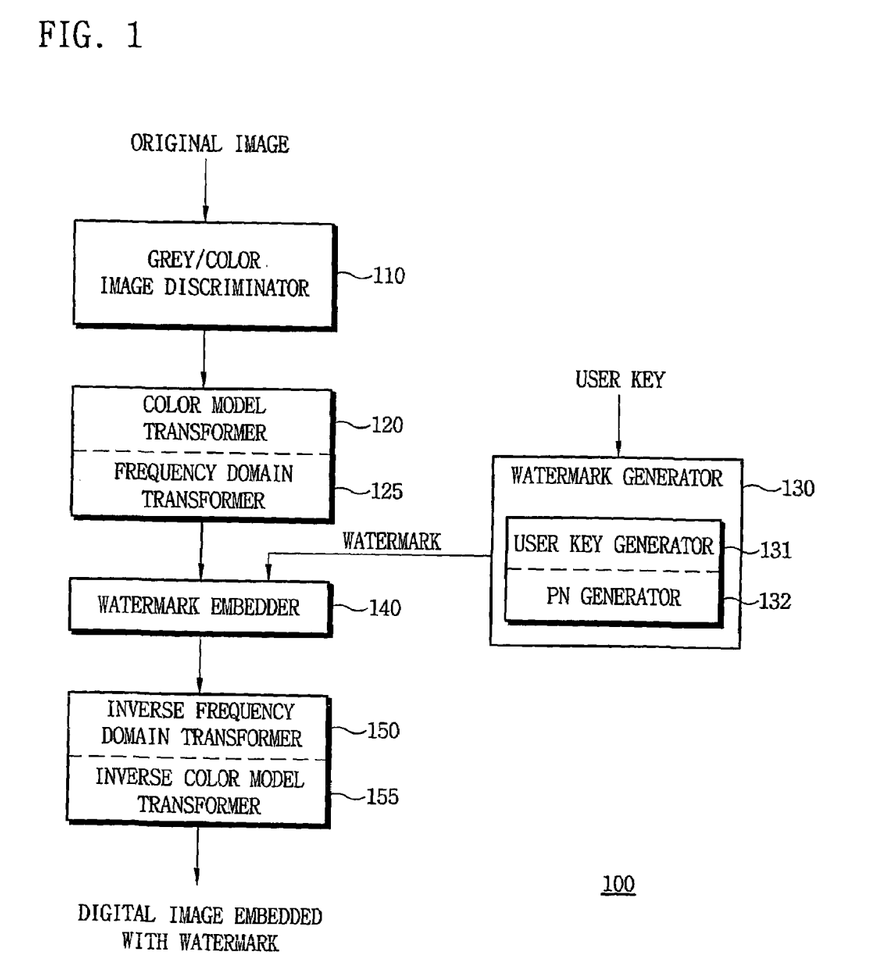
FIG. 1 is a block diagram illustrating schematically the constitution of a watermark-embedding device according to the present invention.
Figure 5:
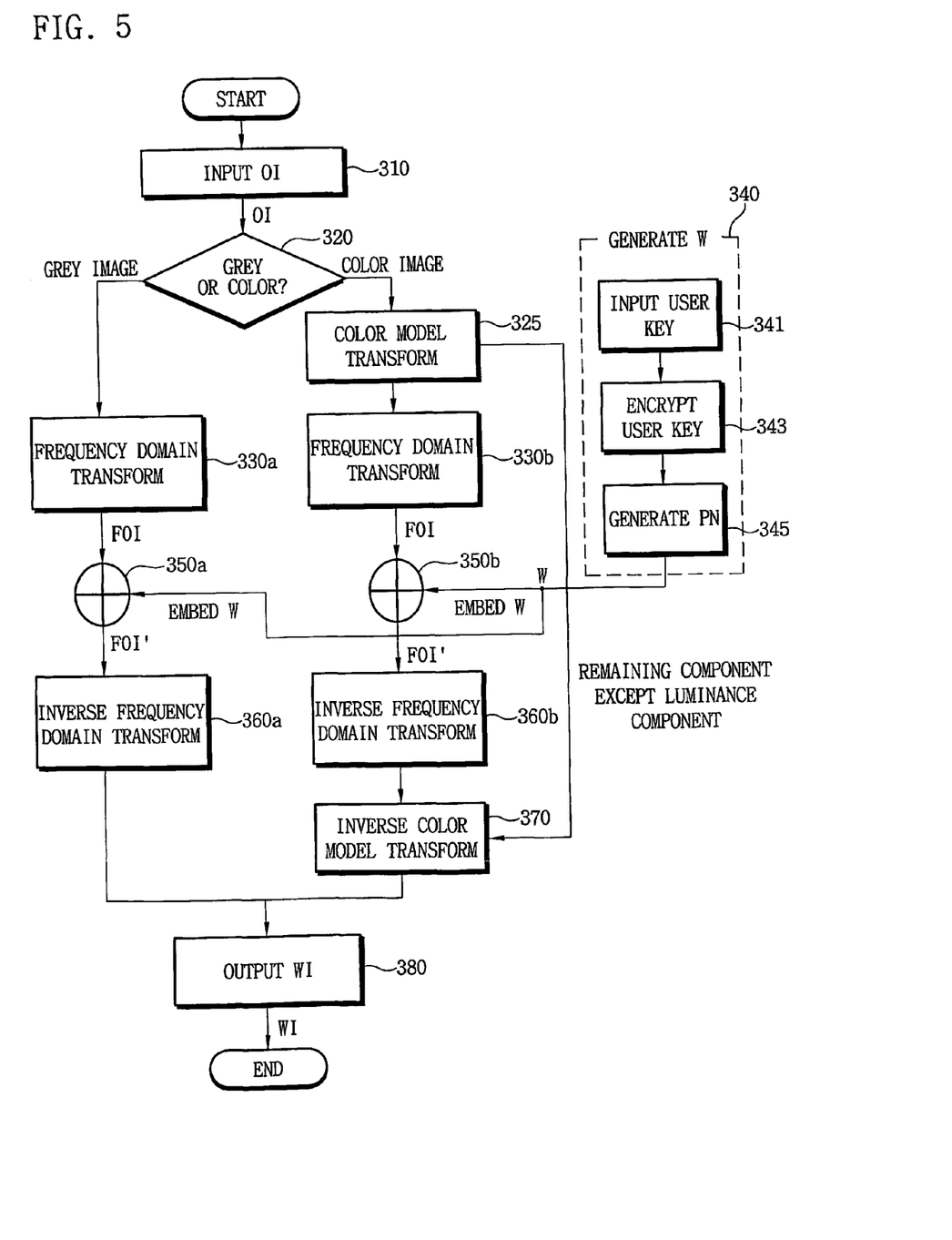
FIG. 5 is a flow chart illustrating a process which embeds a watermark into a digital image according to the present invention.

First, referring to FIG. 1 and FIG. 5, a device and method that embed a watermark in a digital image are explained together. FIG. 1 is a block diagram illustrating schematically the constitution of a watermark embedding device according to the present invention and FIG. 5 is a flow chart illustrating a process which embeds a watermark in a digital image according to the present invention.

A series of processes executed by a watermark embedding device 100 of FIG. 1 corresponds to a process illustrated in FIG. 5. FIG. 1 shows the constituents, which are included in a watermark embedding device 100 by function blocks, and FIG. 5 shows the proceedings executed by the constituents of FIG. 1.

First, an original image (OI) is inputted into a grey/color image discriminator 110 which is included in a watermark embedding device 100 (step 310). The grey/color image discriminator 110 is arranged forth to determine whether the original image (OI) for embedding a watermark is a grey image or a color image. The grey/color image discriminator 110 extracts image information data relating to input original image (OI) format, etc. and then discriminates whether it is a grey image or a color image from the extracted image information data (step 320).

Next, the original image (OI) which experiences the discriminating process (step 320) by a grey/color image discriminator 110 is transformed to a frequency domain by a frequency domain transformer 125. At this time, since a grey image has only a luminance component, in the case the result by a grey/color image discriminator 110 is a grey image, only a frequency domain transform regarding the luminance component is executed and then at once a frequency transform by a frequency domain transformer 125 is executed (step 330a).

Differently from this, in the case the result in the discriminator 110 mentioned above is a color image, first in a color model transformer 120, for example, a color model like RGB mode is transformed to a color model of HSB (H: hue, S: saturation, B: brightness) mode, YIQ (Y: luminance, I: in-phase, Q: quadrature) mode or YCbCr (Y: luminance, Cb/Cr: chrominance) mode, and the luminance component of the transformed color model is extracted (step 325). The luminance component of the color model transformed by a color model transformer 120 is transformed to a frequency domain by a frequency domain transformer 125 (step 330b).

There are many varieties of methods to transform the original image (OI) to the frequency domain in that, representatively, FFT (Fast Fourier Transform), DCT (Discrete Cosine Transform), DWT (Discrete Wavelet Transform), etc. can be used.

The present invention uses the frequency domain method for embedding and extracting a watermark. The frequency domain method has advantages in that it makes removal of watermark difficult by hiding a watermark in the digital image and does not largely deteriorate quality of the original image. In accordance with the frequency domain transformer 125, DCT coefficient, FFT coefficient or DWT coefficient (FOI) can be obtained.

Meanwhile, it is difficult to embed watermark information with a Fourier transform coefficient because Fourier transform coefficients of the transform domain comprise complex numbers, whereas DCT includes a characteristic similar to Fourier transform, but coefficients of the transform domain comprise real numbers. Hence, DCT is more advantageous and easier than Fourier transform. Hereinbelow it is explained as the embodiment that embeds watermark in the DCT coefficient or DWT coefficient regarding the digital image. DCT is basically in a close relation with FFT and is a transform method widely used in the standard JPEG compression, etc.

The first dimensional DCT transform is defined as in the following equation 1a:

$$t(k) = c(k)\sum_{n=0}^{N-1} s(n)\cos\frac{\pi(2n+1)k}{2N} \qquad \text{[Equation 1a]}$$

In the above equation 1a, s is an original signal value, t is a transformed signal value, N shows the length of signal, and coefficient c is as in the following equation 1b:

$$c(o)=\sqrt{1/N},\ c(k)=\sqrt{2/N} \qquad \text{[Equation 1b]}$$

(just in case of $1 \leq k \leq N-1$)

On the other hand, the second dimensional DCT regarding a square matrix is defined as in the following equation 2a:

$$t(i,j) = \qquad \text{[Equation 2a]}$$
$$c(i,j)\sum_{n=0}^{N-1}\sum_{m=0}^{N-1} s(m,n)\cos\frac{\pi(2m+1)i}{2N}\cos\frac{\pi(2n+1)i}{2N}$$

In the above equation 2a, N, s, and t have the same meaning as in the first dimensional DCT transform, c(i,j) is as in the following equation 2b:

$$c(o,j)=1/N,\ c(i,o)=1/N,\ c(i,j)=2/N \qquad \text{[Equation 2b]}$$

(just in case of i≠0, j≠0)

Further, the DCT has an inverse transform and is defined as the following equations 3a and 3b regarding each of the first and second dimensions:

$$s(n) = \sum_{k=0}^{N-1} c(k)t(k)\cos\frac{\pi(2n+1)k}{2N} \qquad \text{[Equation 3a]}$$

$$s(m,n) = \sum_{i=0}^{N-1}\sum_{j=0}^{N-1} c(i,j)t(i,j)\cos\frac{\pi(2m+1)i}{2N}\cos\frac{\pi(2n+1)i}{2N} \qquad \text{[Equation 3b]}$$

Next, the DWT is reviewed. Fourier transform uses a sine function and cosine function as its basis function, whereas Wavelet transform uses wavelet as its basis function, which is divided into a continuous wavelet transform and discrete wavelet transform. The continuous wavelet transform is defined as in the following equation 4.

$$W(s,\tau) = \int_{-\infty}^{\infty} f(t)\psi(s,t)\,dt \qquad \text{[Equation 4]}$$

In the above equation 4, s indicates scaling, τ indicates translation, ψ (s, t) indicates wavelet which is scaled and translated.

The scaling is related to a frequency. A low scaling, i.e., the compressed wavelet extracts a high frequency component and a high scaling, i.e. the extended wavelet extracts a low frequency component. Usually, it is impossible to virtually realize the continuous wavelet transform since the wavelet coefficients obtained from the transform are infinite as a function of scaling and translation.

Hence, it can be more effectively realized if the discrete wavelet transform which selects only a certain frequency domain is used regarding the scaling and translation. However, since the discrete wavelet transform also must stand a lot of computing amount to be realized by a computer, it is preferable to transform the image by using a fast wavelet transform of a filter bank. This method uses the conventional two channels of a sub-band coding and a pyramid algorithm and has advantage that it can be easily realized only if the relation PR-QMF (Perfectly reconstruction quadrature mirror filter) between filter banks for an inverse transform is carried out.

Figure 2:
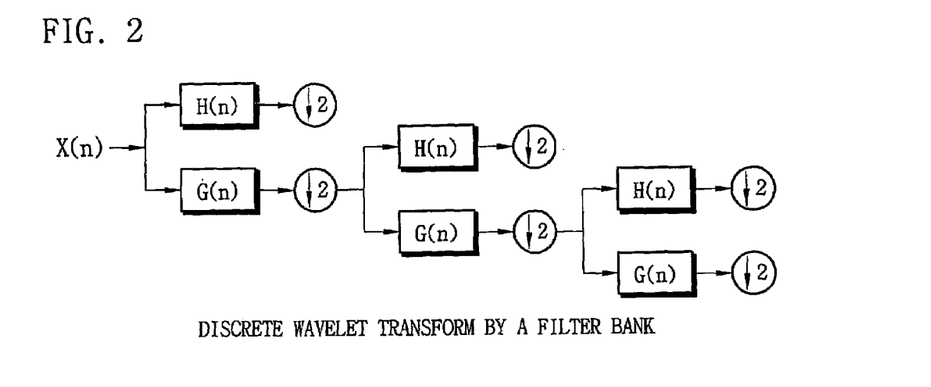
FIG. 2 is a view illustrating a discrete wavelet transform process by a filter bank used in the present invention.
Figure 3:
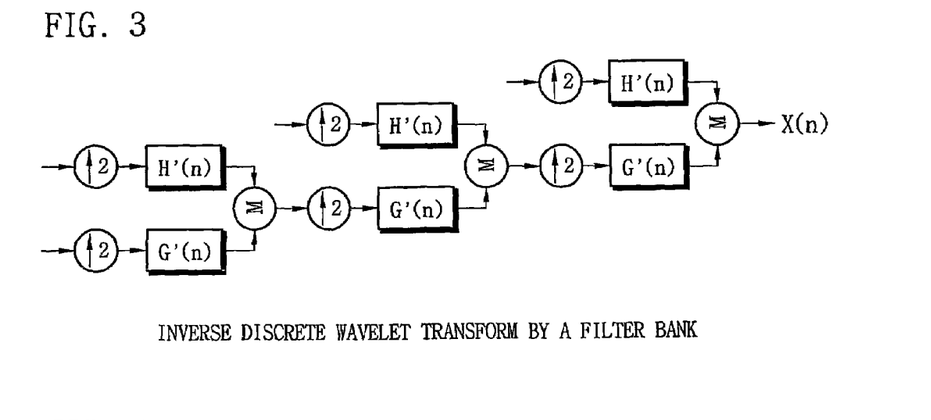
FIG. 3 is a view illustrating a discrete wavelet inverse transform process by a filter bank used in the present invention.
Figure 4:
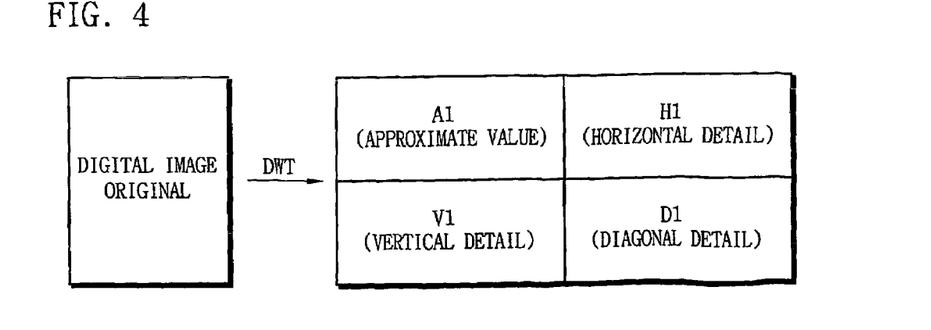
FIG. 4 is a view illustrating a general distribution of coefficients after a discrete wavelet transform used in the present invention.

The abstract of the fast wavelet transform using filter bank is as shown in FIG. 2, FIG. 3, and FIG. 4. FIG. 2 illustrates the process of a discrete wavelet transform by a filter bank used in the present invention, FIG. 3 illustrates the process of a discrete wavelet inverse transform by a filter bank used in the present invention, and FIG. 4 illustrates a general distribution of coefficients after a discrete wavelet transform used in the present invention.

Meanwhile, in accordance with the first embodiment of the present invention, in generating the watermark, a designated user key is inputted from authorized user, and the watermark is generated by the inputted user key. Should the user key be adopted as the watermark, via the correlation between the extracted watermark and the watermark generated from the user key, the authenticity or any change made will be accurately determined. Thus, the present invention has an advantage that strengthens the security of the watermark.

Furthermore, in accordance with one embodiment of the present invention, after encrypting the inputted user key, a watermark to be embedded in the digital image is generated. If the user key undergoes the encryption process, not only the value of the user key will not be easily transformed but also the user key itself can be hidden. Thus, when the watermark generated from the encrypted user key is embedded in the digital image. The present invention has an advantage as the user key itself will not afterwards raise any concern that the user key itself will be revealed when extracting the watermark from the digital image.

The encryption may employ the conventional encryption methods, for example, data encryption standard (DES) method, RSA method, ECC method, etc. According to one embodiment of the present invention, as illustrated in FIG. 1, a PN-code method which outputs in pseudo random number the result of the coded data that will be encrypted is employed.

In order to generate the watermark (W), as illustrated in FIGS. 1 & 5, should the user key be inputted in the watermark generator 130 (Step 341), the user key encryptor 131 and pseudo random number generator 132 included in the watermark generator 130 encrypt the user key using the inputted user key, generate pseudo random number (Steps 343 & 345), and generate watermark (W) which will be embedded in the frequency domain transform coefficient (FOI) of the original image (OI) (Step 340).

The watermark (W) generated from the user key is embedded in the digital image via a process such as the following equation 5 (Step 350a or Step 350b).

$$FOI' = fx(\text{FOI}) \times W \qquad \text{[Equation 5]}$$

wherein, ƒx is a characteristic function for controlling the intensity of the watermark which will be embedded in the original image. ƒx may be variously set up which can be a function either performing an modulo operation of portion of the frequency domain transform coefficient (FOI) of the original image (OI) or rendering statistical values of the multiple transforming coefficients such as the mean, standard deviation, and variance etc.

FOI' represents the result of multiplying watermark (W) to a value applying characteristic function ƒx to the frequency domain transforming coefficient (FOI) of the original image (OI). The transform coefficient (FOI) in the above equation 5 is a value of the frequency domain of the digital image, therefore is in a two dimensional arrangement format. The watermark (W) has one dimensional sequence format so that the transforming coefficient (FOI) is transformed into a sequence format or the watermark is transformed into a two dimensional block to perform the calculation. For performing the calculation, there is a method wherein per a frequency coefficient of the image, a watermark is matched thereto to calculate or a method wherein the statistical characteristics of various frequency coefficients of the image are selected to perform calculation with a watermark.

To explain the process of embedding the watermark in more detail in reference to the equation 5, the watermark embedder (140) executes a process replacing a transform coefficient of another designated particular frequency area with the result (FOI', hereinafter refer to as "replacement coefficient") of multiplying the value obtained from applying characteristic function $fx$ to the absolute value of the transform coefficient of the designated particular frequency area (hereinafter, refer to as "embedding coefficient") by watermark.

For example, when the digital image is divided into low frequency, middle frequency and high frequency areas, the watermark is embedded into the middle or high frequency areas containing relatively less digital image information. The watermark embedding is completed by replacing the transforming coefficient of the existing middle or high frequency areas with the result (replacement coefficient) of multiplying the result from applying characteristic function $fx$ to the transform coefficient (embedding coefficient) of the low frequency area by watermark.

According to such method, even though there is a compressing process abandoning the high frequency portion or a transformation, such as blurring, the watermark is multiplied by the coefficient of the low frequency area and replaced to the high frequency area, after the transformation, relatively large portion of the high frequency area remains. Thus, the present invention has an advantage of being robust to against the transformation.

The present specification sets forth the replacement of the watermark multiplied by the result obtained from applying the characteristic function $fx$ to the absolute value of the coefficient of the low frequency area between to the areas the middle frequency and high frequency as an example. However, the watermark can be embedded by selecting a frequency area with range that does not degrade the quality of the digital image. For instance, as it is possible to replace the watermark to the high frequency area after being multiplied by the result from applying the characteristic function to the absolute value of the transforming coefficient of the high frequency area, a method embedding the watermark in the digital image transformed to the frequency area is not limited thereto, but is also applicable to several frequency areas.

Also, in embodiments of the present invention, the overall characteristics of the image are not easily changed from the print and adopt the characteristics of the frequency domain, which does not change the overall characteristics of the image by compensating the coefficient of the other frequency area with the arbitrary coefficient of the frequency area, making it sturdy at printing. Thus, disappearance of the watermark at printing, etc. will be prevented. Furthermore, according to the watermark embedding method using the aforementioned characteristics of the frequency domain, because the overall characteristics of the digital image will not change even at the embedding of the watermark, i.e. the quality of the original image is not degraded, and it is possible to enjoy the quality of the original image even after being printed.

In equation 5, the intensity of the robustness of the watermark (W) when the watermark (W) is embedded in the original image (01) is controlled by function $fx$. Any value can become said characteristic function value since the value can be set up by user as he pleases, and particularly, an appropriate function that does not degrade the quality of the digital image from embedding the watermark (W) can be determined. In other words, intensity of the robustness of the watermark is indirectly related with quality of the digital image or vice versa. Therefore, it is desirable to make a determination of an environment in which the watermark is used and a maintenance of the quality of the digital image.

Now, in order to acquire digital image embedded with watermark, an inverse frequency domain transformer (150) restores the transformed digital image. (Step 360*a* or Step 360*b*) When the aforementioned frequency domain transformer 125 employs discrete cosine transform (DCT) or discrete wavelet transform (DWT) or fast fourier transform (FFT), the inverse frequency domain transformer 150 employs inverse discrete cosine transform (IDCT) or inverse discrete wavelet transform (IDWT) or inverse fast fourier transform (IFFT). At this point, when the original image (OI) is in color image, the color model of HSB mode, YIQ mode or YCbCr mode is restored by inverse color model transformer 155 to the original color model from employing the remaining constituent which did not undergo the frequency domain transformation and the luminance constituent wherein the inverse frequency domain transformation is conducted (Step 370). Finally, by acquiring the digital image (WI) embedded with the watermark (Step 380), the embedding process of the watermark to the digital image is completed.

Figure 6:
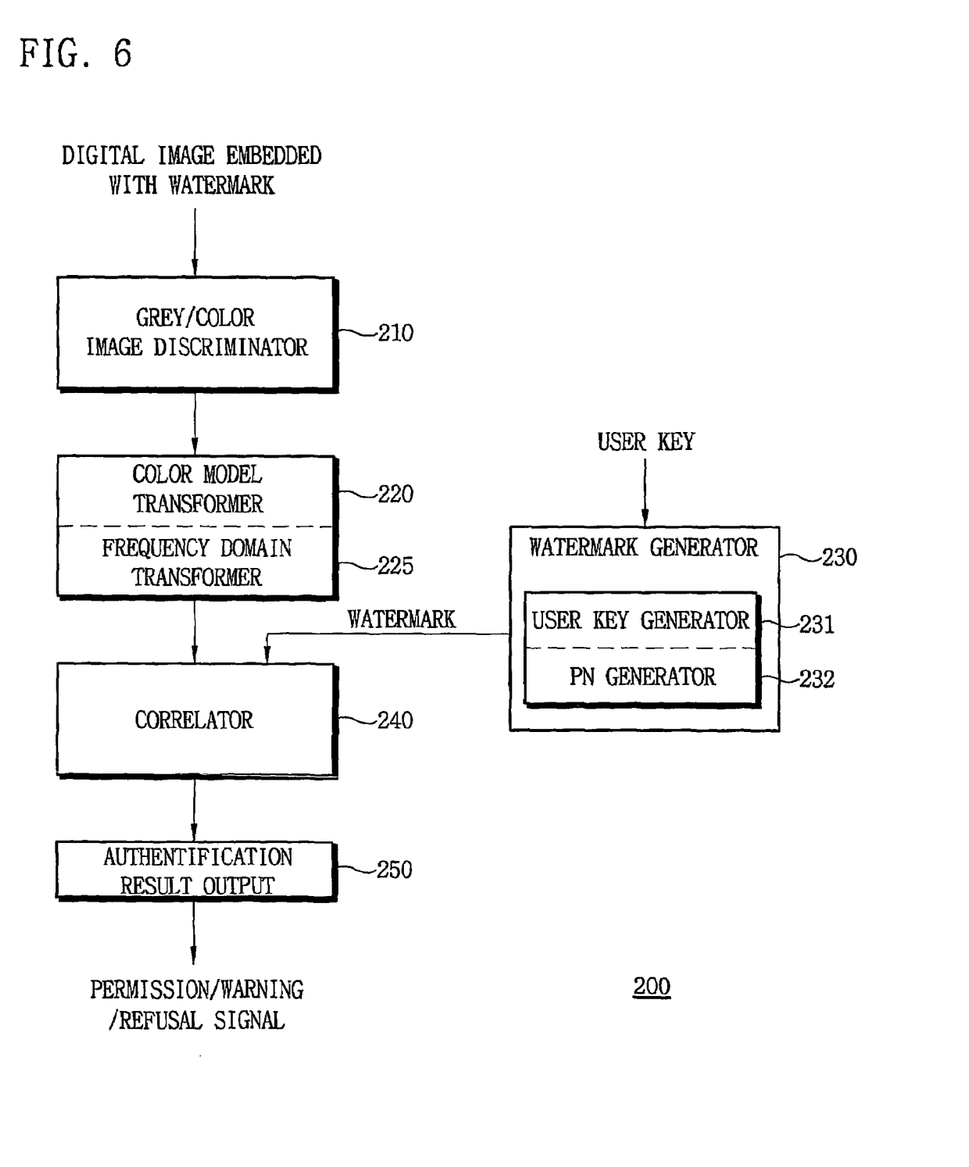
FIG. 6 is a block diagram illustrating schematically the constitution of a watermark-authenticating device according to the present invention.
Figure 7:
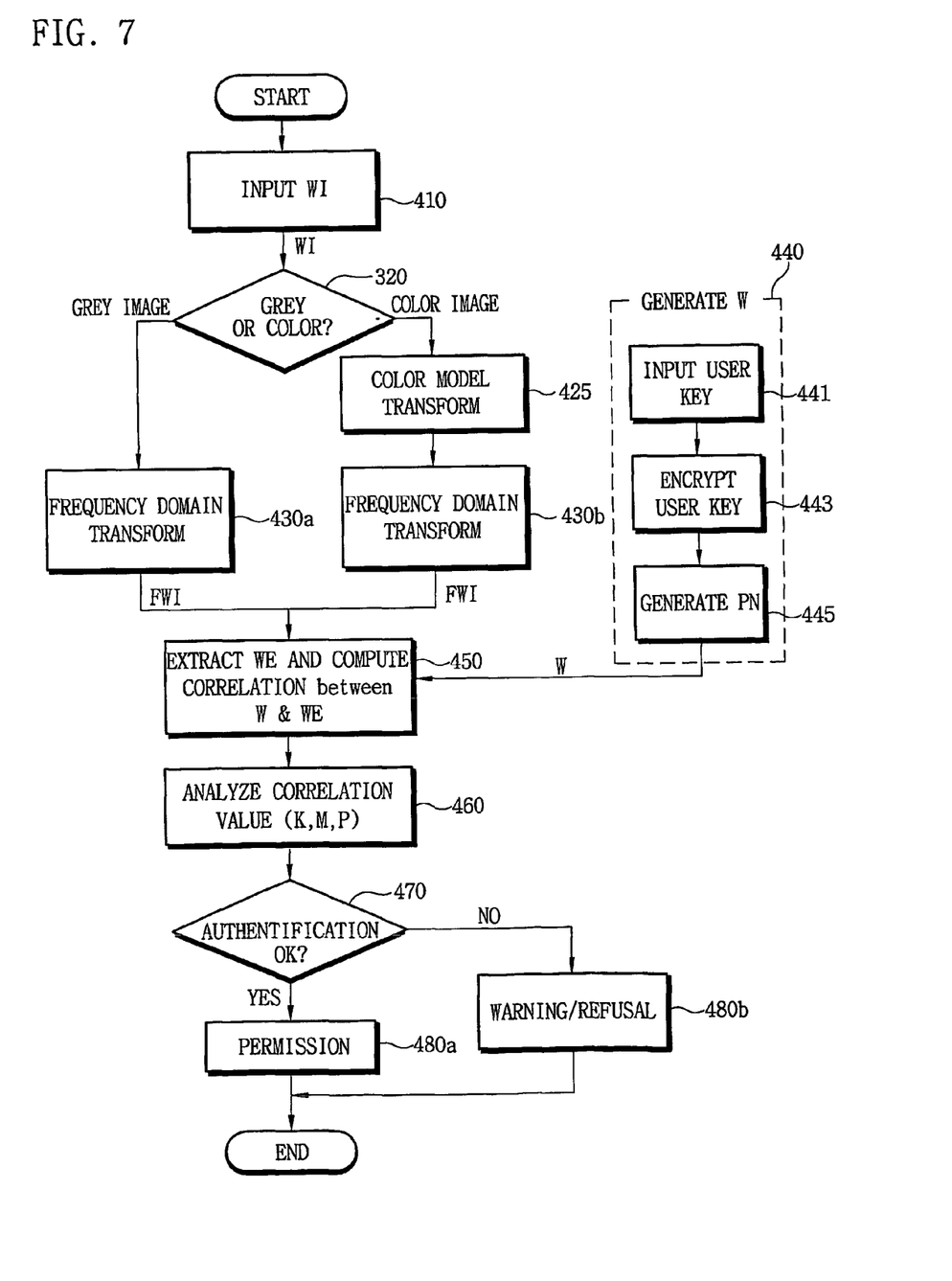
FIG. 7 is a flow chart illustrating a process that extracts a watermark from a digital image and outputs the authentication result from the computation and analysis of the correlation of the extracted watermark according to the present invention.

Referring to FIG. 6 and FIG. 7, the authentication result output device and the method of extracting watermark from the digital image embedded with watermark and via correlation between the extracted watermark and the watermark generated from the user key are explained below.

FIG. 6 is a block diagram illustrating schematically the constitution of the watermark authenticating device according to the present invention, and FIG. 7 is a flow chart illustrating the process of extracting watermark from the digital image according to the present invention and outputting the authentication result from the computation and analysis of the correlation to the extracted watermark.

A series of process performed by the watermark authenticating device 200 of FIG. 6 corresponds to a process illustrated in FIG. 7. FIG. 6 depicts the constituent elements included in the watermark extraction and authentication device 200 in blocks according to their functions, and FIG. 7 depicts the extraction and authentication processes performed by the constituent elements of FIG. 6.

First, the digital image (WI) embedded with watermark is inputted into the grey/color image discriminator 210 of the watermark extraction and authentication device 200 (Step 410). The grey/color image discriminator 210, color model transformer 220, and frequency domain transformer 225 of FIG. 6 are identical to the grey/color image discriminator 110, color model transformer 120, and frequency domain transformer 125 of FIG. 1 in aspect of their operation and function.

In other words, the image (WI) embedded in the watermark is identified whether it is in grey image or in color image (Step 420), and should the image embedded in the watermark be in grey image, the frequency domain transform with regard to luminance constituent is conducted by frequency domain transformer 225 (Step 430*a*). If the image (WI) embedded in the watermark is in color image, first, the image is transformed to color model such as HSB mode, YIQ mode or YCbCr mode, etc. by color model transformer 220 (Step 425). Then, by the frequency domain transformer 225, the frequency domain transform such as discrete cosine transform (DCT) or discrete wavelet transform (DWT) or fast fourier transform (FFT) regarding luminance constituent is conducted (Step 430*b*).

As illustrated in FIG. 6 and FIG. 7, should the user key be inputted in the watermark generator 230 (Step 441), the user key is encrypted by the user key encryptor 231 (Step 443) in the identical method as the watermark embedding process of FIG. 5, and watermark (W) according to PN-code method is generated by pseudo random number generator 232 (Step 445). The watermark generator 230 and the watermark generating process 440 of FIG. 6 and FIG. 7 are identical to the watermark generator 130 and the watermark generating process 340 of FIG. 1 and FIG. 5.

Next, the correlator 240 performs the inverse process of watermark embedding to extract a watermark (WE) embedded in the digital image from the frequency domain transform coefficient (FWI) of the digital image embedded with the watermark obtained from the result of the frequency domain transform, and computes the correlation between the two watermarks (W and WE) (Step 450) During watermark extraction, the process multiplying the result of applying the characteristic function to the coefficient of the designated particular frequency area by the watermark and embedding into a coefficient of the other designated particular frequency area coefficient is inversely processed. From the digital image embedded with watermark, the replacement coefficient (FOI') embedded in the aforementioned particular frequency area and the embedding coefficient (FOI) used in the replacement coefficient (FOI') calculation are obtained, and using these embedding coefficient and replacement coefficient, the watermark is restored. The correlation between the restored watermark (WE) and the watermark (W) generated by a method used in the watermark embedding is obtained so that it is possible to determine whether the designated watermark is in the digital image.

Though it has not been illustrated in the drawings, other than the method generating the watermark from the user key, for example, there is an embodiment embedding and extracting any one of the various watermarks stored in advance in the designated storing medium. For example, when the user key is not inputted, it is possible to determine whether the predetermined watermark is embedded by comparing the watermark obtained from the embedding coefficient and the replacement coefficient, for example, with the various watermarks stored in advance.

In any case, the watermark can be directly extracted from coefficient values of the frequency domain of the image embedded with watermark, therefore the original image is not required.

Nevertheless, when the watermark has a sequence with arbitrary values, in order to restore the watermark, the embedding coefficient and the replacement coefficient values should be used. For example, if the watermark contains binary sequence of only 1 and −1, the value of the watermark can be restored only by the signs of the replacement coefficient under the assumption that the value of characteristic function $fx$ is always positive.

The correlator 240 obtains the correlation between the watermark (WE) extracted as above and the watermark (W) generated by employing the key inputted by the user and the correlation values thereof to confirm the watermark embedding designated by the user. Thus, it is possible to know by watermark extraction and authentication device 200 whether the digital image under inspection is authentic or altered.

The method to obtain the correlation between the two watermarks (WE and W) of the correlator 240 and the correlation values thereof is explained below.

The correlation between the two watermarks (WE and W) can be obtained from the following equation 6:

$$Corr(WE, W) = \sum_{k=0}^{N-1} WE \cdot W \equiv real(IFFT(FFT(WE) \times \overline{(FFT(W)} \times FFT(W)))) \quad \text{[Equation 6]}$$

wherein, $\overline{FFT(W)}$ is a conjugate complex of FFT(W), and IFFT(W) represents an inverse FFT(W).

The result of the correlation obtained from the above Mathematical Formula 6 is not a certain value, but is in a sequence form $(X_1, - - -, X_N)$. Accordingly, the maximum peak value M and its position P are obtained in comparison of the obtained plurality numbers of values $(X_1 \sim X_N)$.

Next, from the result of the correlation obtained from the following equation 6, the sharpness, i.e. the forth moment Kurtosis (K) is obtained from the equation 7.

$$Kurt(x_1, \ldots, x_n) = \left\{ \frac{1}{N} \sum_{j=1}^{N} \left[ \frac{x_j - \bar{x}}{\sigma} \right]^4 \right\} - 3 \quad \text{[Equation 7]}$$

wherein, $X_1, - - -, X_N$ is a sequence obtained from the above explained equation 6, and they are the resulting values of the correlation between two watermarks (W and WE). $\bar{\chi}$ is the average of $X_1, - - -, X_N$ and $\sigma$ represents the standard deviation.

When analyzing the correlation values K, M and P obtained as above (Step 460), it is possible to determine whether the watermark (W) generated by the designated user key agrees to the watermark (WE) extracted. In more detail, when the correlation value K, i.e. Kurtosis is less than the predetermined threshold, the two watermarks (W and WE) do not agree to each other, and also when the maximum peak value (M) is less than the predetermined threshold, it represents that the two watermarks (W and WE) do not agree to each other. Furthermore, only when the position (P) of the maximum peak value of the two watermarks (W and WE) is always identical, it means that the two watermarks (W and WE) agree to each other. Moreover, PN-code generated by the watermark generator (230) has '0'correlation degree with PN-code excluding the signal of its own. Thus, when the correlation degree by PN-code is also the predetermined critical value or more, it means that the two watermarks (W and WE) are same each other. Accordingly, when the digital image satisfies all the requirements of the above-mentioned correlation values, it means that the two watermarks (W and WE) agree with each other so that the authentication of the digital image can be confirmed. For instance, a person in possession of a certificate printed with a digital image watermarked in accordance with the result analyzing the requirements of the correlation values such as Step 370 of FIG. 7 is either authenticated or for example, is permitted his pass (Step 480a), or his authentication is rejection by, for example, refusing his pass or giving a warning (Step 480b).

In order to evaluate the digital watermarking device and method according to the present invention, an experiment extracting the watermark after embedding the watermark with the digital image of size 256×256 and then inflicting transformation such as dithering, halftone, and blurring etc. is conducted. With regard to this experiment, the extraction result of approximately 99.92% is obtained. The experiment is continuously conducted to extract watermark after the image printed from a printer in a resolution of 300 dpi is generated again into the digital image using a scanner and a digital camera. This experiment showed a high extraction rate of more than 95%. Hence, it has been proved that the present invention has a watermarking technique powerful against the transformation resulting from being printed.

As described above, according to the digital image watermarking apparatus and method of the present invention, principle of the present invention using the characteristic of the frequency domain provides such advantages that the quality of original image is guaranteed against embedment and extraction of watermark, and the watermark that is resistant to printing or image transform can be extracted without using the original image. Also, the security and accuracy of watermark are significantly strengthened by embedding watermark generated from a user key, authenticating a digital image only when watermark generated from the user key inputted by a user is consistent with the watermark as extracted when extracting watermark, and using the correlation value such as the 4th moment (Kurtosis).

The apparatus and method of the present invention, being resistant to the printing and providing the enhanced security, are applicable to various applied examples requiring a copyright or authentication as printed matters and confirmation of personal information. That is, it is provided an information security device and method thereof as preconditions for activating electronic commerce, an electronic certificate of authentication, an electronic identification card, an electronic registration, an internet coupon, electronic cash, an identification card, a school record and the like on large-scale network such as internet. Also, since it is possible to prevent illegal transformation or use such as forgery and alteration of information needed for secret maintenance, the present invention can be widely applied to the intellectual property protection industry field of copyrighted digital image materials as well as protection of personal information.

Although the preferred embodiments of the digital image watermarking apparatus and method according to the present invention are disclosed for illustrative purposes, it will be obvious to those skilled in the art that such embodiments are merely for illustrations but are not restricted to the illustrations themselves, and can be variously changed, transformed and replaced within the scope of the technical idea of the present invention. Further, it should be understood that the technical idea of the present invention is not restricted to the aforementioned embodiments but to only the claims attached hereto and their equivalent technical principle.

What is claimed is:

1. A method for embedding watermark into a digital image having a luminance component, comprising:
    (a) transforming said luminance component into coefficients of a frequency domain having a first frequency area and a second frequency area;
    (b) generating a replacement coefficient from a coefficient of said first frequency area and said watermark;
    (c) replacing a coefficient of said second frequency area with said replacement coefficient, whereby said watermark is embedded into said digital image;
    (d) transforming said digital image embedded with said watermark into an inverse frequency domain;
    (e) transforming the luminance component of the digital image embedded with said watermark into the coefficients of the frequency domain;
    (f) generating a watermark for authentication;
    (g) extracting said watermark embedded in said digital image by using the coefficients of said first and second frequency domains; and
    (h) authenticating said digital image by finding a correlation of said extracted watermark and said watermark for authentication, wherein (h) comprises:
    (h1) finding the maximum peak value and the position of said maximum peak value from the correlation between said extracted watermark and said watermark for authentication;
    (h2) finding the 4th moment from said correlation;
    (h3) judging that said extracted watermark is same with said watermark for authentication in case where said 4th moment is over a predetermined critical value, the maximum peak value of said correlation is over a predetermined critical value, and the position of the maximum peak value of the extracted watermark and the watermark for authentication are the same.

2. The method according to claim 1, wherein said digital image is a color image and said method further comprises:
    before (a), (a') transforming said digital image into a color model including the luminance component and extracting the luminance component of said transformed color model; and
    after (d), (d') performing a color model inverse transform of said digital image as transformed into said inverse frequency domain by using the luminance component for which said inverse frequency domain transform is performed, and the remaining components with the exception of said luminance component for which said frequency domain transform is not performed.

3. The method according to claim 2, wherein said color model including said luminance component is one of HSB mode, YIQ mode and YCbCr mode.

4. The method according to claim 1, wherein said replacement coefficient is generated in such manner that said watermark is multiplied by the operation result obtained by applying a predetermined characteristic function to an absolute value of the coefficient of said first frequency area.

5. The method according to claim 4, wherein said first frequency area is a low frequency area and said second frequency area is between a middle frequency area and a high frequency area.

6. The method according to claim 4, wherein said characteristic function is the modulo operation result of parts of said frequency domain transform coefficients, or a function represents the statistical characteristic of said frequency domain transform coefficients.

7. The method according to claim 1, wherein (a) uses one of among FFT, DCT, and DWT.

8. The method according to claim 1, wherein said watermark is generated by encrypting a user key and generating pseudo random number from said encrypted user key.

9. The method according to claim 8, wherein said encryption is executed by PN-code method.

10. The method according to claim 1, wherein said watermark for authentication is generated by encrypting a user key and generating pseudo random number from said encrypted user key.

11. The method according to claim 1, wherein (h) comprises:
    if a user key is encoded in PN-code method during the embedding process of said watermark, judging the consistency of said extracted watermark and said watermark for authentication when the correlation by said PN-code method is over the predetermined critical value.

12. An apparatus for embedding a watermark into a digital image having a luminance component, comprising:
    a frequency domain transformer for transforming said luminance component into coefficients of a frequency domain having a first frequency area and a second frequency area;
    a watermark generator for generating said watermark;
    a replacement coefficient generator for generating a replacement coefficient from a coefficient of said first frequency area and said watermark;

a replacing device for replacing a coefficient of said second frequency area with said replacement coefficient, whereby said watermark is embedded into said digital image;

an inverse frequency domain transformer for transforming said digital image embedded with said watermark into an inverse frequency domain;

a frequency domain transformer for transforming the luminance component of the digital image embedded with said watermark into coefficients of the frequency domain;

a watermark generator for generating watermark for authentication;

a watermark extractor for extracting said watermark embedded into said digital image by using the coefficients of said first and second frequency domains; and a correlation computation device for authenticating said digital image by finding a correlation between said extracted watermark and said watermark for authentication, wherein the correlation computation device finds the maximum peak value and the position of said maximum peak value from the correlation between said extracted watermark and said watermark for authentication, finds the 4th moment from said correlation, and judges that said extracted watermark is same with said watermark for authentication in case where said 4th moment is over a predetermined critical value, the maximum peak value of said correlation is over a predetermined critical value, and the position of the maximum peak value of the extracted watermark and the watermark for authentication are the same.

13. The apparatus according to claim 12, further comprising:

a color discriminator for discriminating whether said digital image is a grey image or a color image;

in case where said digital image is the color image, the apparatus further comprising:

a color model transformer for transforming said digital image to a color model including the luminance component and extracting the luminance component of said transformed color model to provide said frequency domain transform means; and an inverse color model transformer for performing a color model inverse transform of said digital image transformed from said inverse frequency domain transform means, by using the luminance components for which said inverse frequency domain transform is performed, and the remaining components with the exception of said luminance components for which said frequency domain transform is not conformed.

14. The apparatus according to claim 12, wherein said watermark generator comprises:

an encrypting device for encrypting a user key; and a pseudo random number generator for generating a pseudo random number from said encrypted user key.

* * * * *

UNITED STATES PATENT AND TRADEMARK OFFICE
CERTIFICATE OF CORRECTION

PATENT NO. : 7,280,669 B2  
APPLICATION NO. : 10/380389  
DATED : October 9, 2007  
INVENTOR(S) : Choi et al.

Page 1 of 1

It is certified that error appears in the above-identified patent and that said Letters Patent is hereby corrected as shown below:

On the title page:

Please add the following:

--(30)    Foreign Application Priority Data

Sept. 9, 2000   (KR)……………………………...2000-0057355--

Signed and Sealed this

Twenty-fifth Day of December, 2007

JON W. DUDAS  
*Director of the United States Patent and Trademark Office*